(No Model.)

2 Sheets—Sheet 1.

G. TYLER.
SEED AND FERTILIZER DISTRIBUTER.

No. 299,184.  Patented May 27, 1884.

Witnesses.
S. N. Piper
E. C. Pratt

Inventor.
George Tyler
by R. H. Eddy atty.

(No Model.) 2 Sheets—Sheet 2.

G. TYLER.
SEED AND FERTILIZER DISTRIBUTER.

No. 299,184. Patented May 27, 1884.

Witnesses.
S. N. Piper.
E. B. Pratt.

Inventor.
George Tyler.
by R. H. Eddy atty.

UNITED STATES PATENT OFFICE.

GEORGE TYLER, OF WALTHAM, MASSACHUSETTS.

SEED AND FERTILIZER DISTRIBUTER.

SPECIFICATION forming part of Letters Patent No. 299,184, dated May 27, 1884.

Application filed February 18, 1884. (No model.)

*To all whom it may concern:*

Be it known that I, GEORGE TYLER, of Waltham, in the county of Middlesex, of the Commonwealth of Massachusetts, have invented a new and useful Improvement in Mechanism for Spreading Manure, Seed, or Fertilizing Material; and I do hereby declare the same to be described in the following specification and represented in the accompanying drawings, of which—

Figure 1:
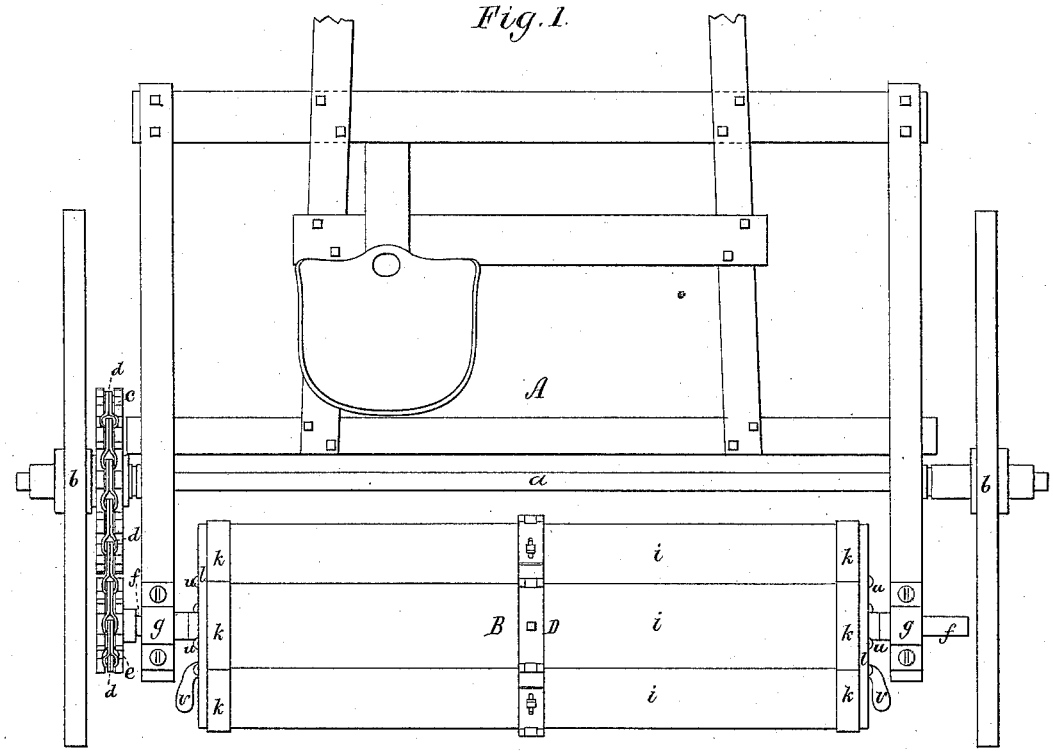
Figure 2:
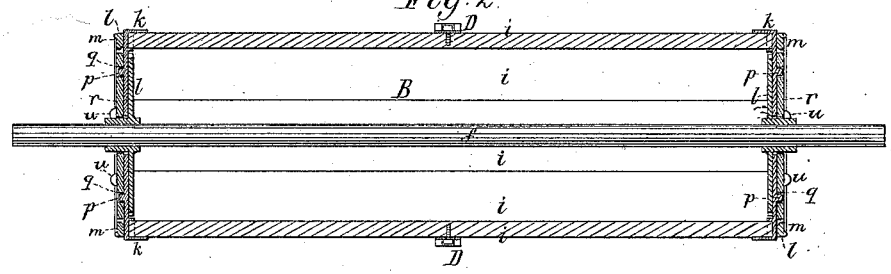
Figure 3:
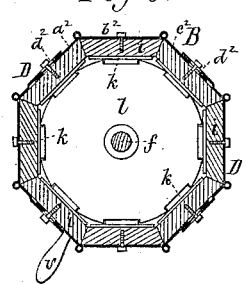
Figure 4:
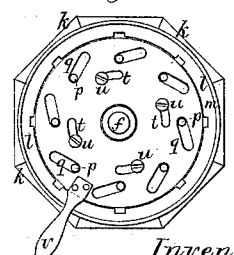
Figure 6:
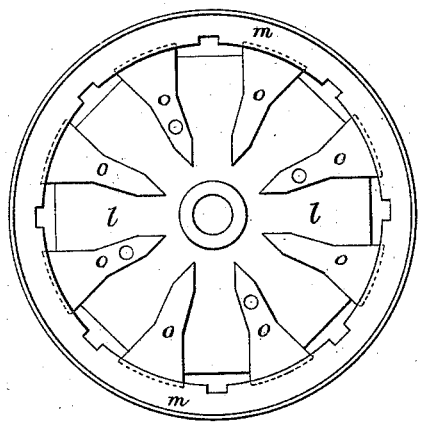
Figure 5:
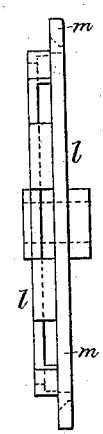
Figure 7:
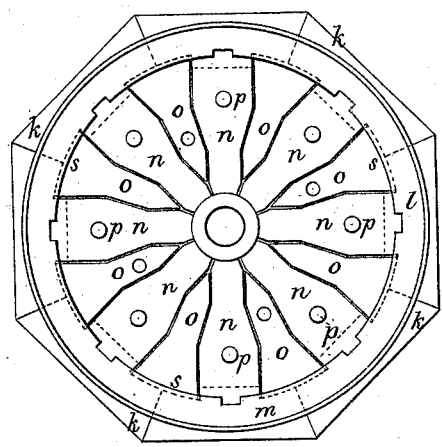
Figure 8:
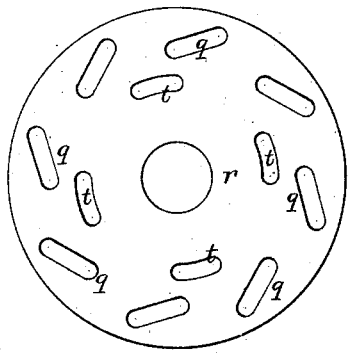
Figure 10:
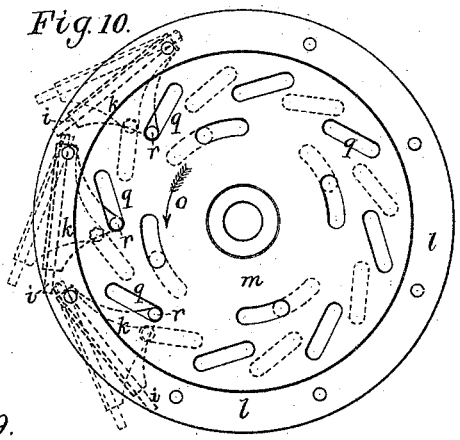
Figure 9:
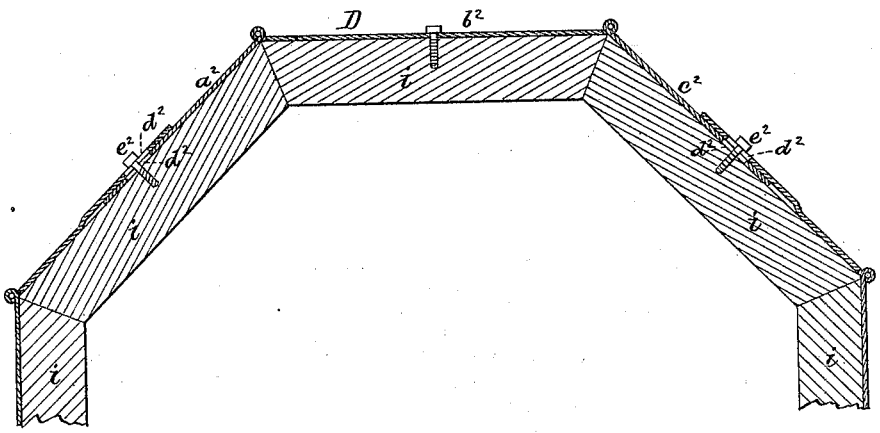

Figure 1 is a top view of a two-wheeled carriage provided with my invention, the nature of which is defined in the claims hereinafter presented. Fig. 2 is a longitudinal section, Fig. 3 a transverse section, and Fig. 4 an end view, of the rotary distributer of such carriage. Fig. 5 is an edge view, and Fig. 6 an outer side view, of one of the wheels for holding a set of the movable radial supporters of the lags of the distributer. Fig. 7 is a view of such grooved wheel and its set of lag-supporters. Fig. 8 is a view of the slotted disk for operating such lag-supporter. Fig. 9 is a transverse section on an enlarged scale of several of the lags and their median expansive and contractile band. Fig. 10 is hereinafter described.

In such drawings, A denotes a carriage, whose axle $a$ is provided with two wheels, $b\ b$. Such axle also has fixed on it a sprocket-wheel, $c$, around which and a similar wheel, $e$, an endless chain, $d$, extends, the said wheel $e$ being fixed on the shaft $f$ of the distributer B. The said distributer, arranged in rear of the said axle and parallel therewith, has the journals of its shaft supported in boxes $g\ g$, fixed to the carriage. The distributer is to receive a material to be discharged from it, whatever such material may be—that is, whether it be seed, a fertilizer, plaster-of-paris, or other substance in a powdered or comminuted condition.

My improvement relates to such distributer or to its construction, which may be thus explained: It has a series of lags or boards, $i$, which are arranged relatively to each other, as represented—that is, as the staves of a barrel. Each of such lags is secured at its ends to two arms or supporters, $k$, of two sets of such, those of each set being so arranged in and adapted to a sustaining-wheel, $l$, as to be capable of being separately moved radially therein or to the axis of such wheels. This wheel is a disk having projecting from one side of it at its periphery an annular flange, $m$, which has in it a series of radial perforations for the tails $n$ of the supporters $k$ to pass through and into spaces between guides or projections $o$, arranged on and extending from the disk in manner as represented. From each of the said tails a stud, $p$, projects into one of a series of straight slots, $q$, arranged obliquely, in manner as shown, in a disk, $r$, that rests in an annular rabbet, $s$, made in the face of the flange $m$. Furthermore, there is in the said disk another series of slots, $t$, which are arcal in shape and arranged at equal distances apart in a circle. Set-screws $u$ go through these slots $t$ and screw into the guides or projections $o$, such screws being for the purpose of clamping the disk firmly to the wheel, as occasion may require, to hold the lags in position on their being adjusted to any desirable distances apart. One of the lags should be adapted to its two radial supporters, $k$, so as to be readily removable from them, in order to admit of the distributer being charged with a material to be dropped from it while it may be revolving; or, instead of such application of the lag, such lag may have in it a doorway and a door thereto to close such doorway. There projects from each disk $r$ a handle, $v$, to aid in turning the disk on the wheel-shaft. By revolving the said disk a little in one direction all of the lag-supporters of the wheel next adjacent to the disk will be moved radially and outwardly, whereby the lags will also be so moved, and in so moving will be caused to separate more or less from each other at their edges.

From the above it will be seen that by means as described the lags may be adjusted to either close them together or to cause them to stand apart from each other at such distance as may be desirable or requisite for the proper discharge between them of the material from the distributer while the latter may be in revolution, as it will be when the carriage may be in movement.

Fig. 10 of the drawings is a view of one end of the expansive and contractile distributer, having each of the supporters of the lags pivoted in a manner to swing out and in to either move the lags apart or close them together. In Fig. 10 a portion of one of the series of lags is shown at $i\ i$, &c., as fastened to supporters $k\ k$, &c., each of which, at its rear end, is pivoted to a ring, $l$, encompassing a disk, $m$, in which are a series of oblique slots, $q$, into each of which a stud, $r$, from one of the supporters extends. On partially revolving the disk $m$ in the direction of the arrow $o$ the supporters, with their lags, will be turned outward, so as to have the lags open apart from each other, as may be required. This mode of applying the lags and supporters may be adopted in the place of such as hereinbefore described, and may be considered as mechanical equivalents therefor. Extending around the series of lags at their middles is an expansive and contractile band, D, which is to prevent them there from springing or bending apart under the weight or pressure of a load in the distributer. This band is contracted as follows—that is to say, is composed of a series of slotted and hinged sections lapped on each other and held together and to the lags by set-screws. Each section consists of three flat bars, $a^2\ b^2\ c^2$, hinged together at their ends, there being a slot, $d^2$, in each of the two outer bars. The middle bar is fastened by one or more screws to one of the lags, the other bars being extended across the next two adjacent lags and lapped on bars of the next sections. Clamp-screws $e^2$ go through the slots of the lapped bars and screw into lags, over which they project. These screws are to be loosened preparatory to each adjustment of the lags, and on being tightened serve, with the sections, to keep the lags from spreading apart at their middles under the weight of the load in the distributer.

I claim—

1. The expansive and contractile distributer, substantially as described, consisting of the series of lags, their two sets of radially-movable supporters, their sustaining-wheels and operative studs, and slotted disks, arranged and combined substantially in manner and to operate as set forth.

2. The combination of the clamping-screws with the disk having the oblique and arcal slots, as described, and with the series of radially-movable lag-supporters and their sustaing-wheel, all being arranged and adapted substantially as represented.

3. The expansive and contractile band D, constructed and applied to the lags of the distributer substantially as described—that is to say, made of slotted sections lapped on each other, and each composed of three bars hinged together as represented, and secured to the lags by screws, as set forth.

GEORGE TYLER.

Witnesses:
R. H. EDDY,
E. B. PRATT.